(Model.)
G. BIEHN & R. WEIDAUER.
Band Cutter.
No. 234,944.      Patented Nov. 30, 1880.
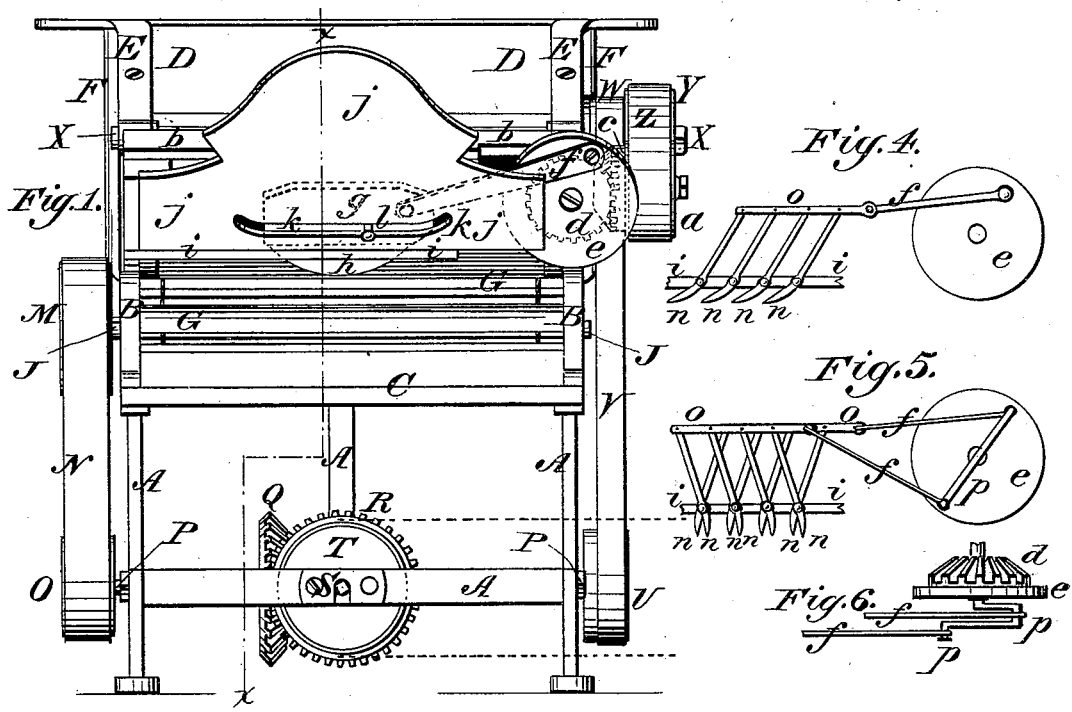
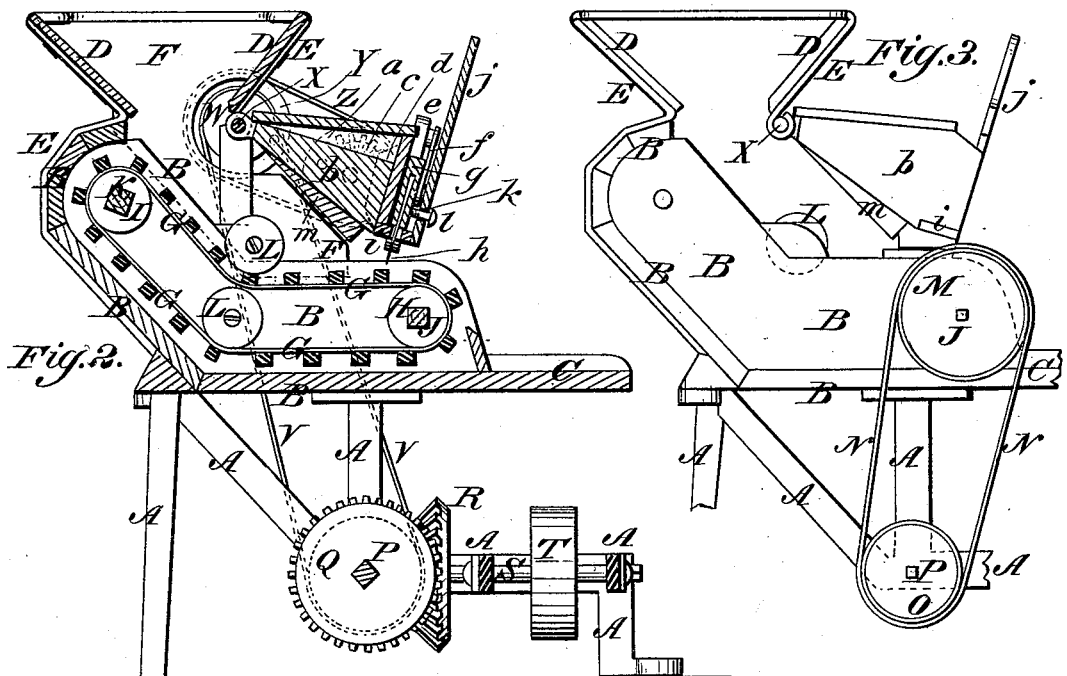
WITNESSES:
Donn P. Twitchell.
C. Sedgwick
INVENTOR:
G. Biehn
R. Weidauer
BY Munn & Co.
ATTORNEYS.

UNITED STATES PATENT OFFICE.

GEORGE BIEHN AND RUDOLPH WEIDAUER, OF RACINE, WISCONSIN.

BAND-CUTTER.

SPECIFICATION forming part of Letters Patent No. 234,944, dated November 30, 1880.

Application filed September 8, 1880. (Model.)

*To all whom it may concern:*

Be it known that we, GEORGE BIEHN and RUDOLPH WEIDAUER, of Racine, in the county of Racine and State of Wisconsin, have invented a new and useful Improvement in Band-Cutters, of which the following is a specification.

Figure 1 is a front elevation of the improvement. Fig. 2 is a sectional side elevation taken through the line $x\ x$, Fig. 1. Fig. 3 is a side elevation. Fig. 4 shows a modification of the cutting mechanism. Fig. 5 shows another modification of the cutting mechanism. Fig. 6 is a top view of a part of the mechanism shown in Fig. 5.

Similar letters of reference indicate corresponding parts.

The object of this invention is to furnish band-cutters for thrashing-machines so constructed as to cut the bands rapidly and surely and deliver the grain in good condition to the feeder, and which will protect the feeder from being accidentally cut by the knife of the band-cutter.

The invention consists in constructing a band-cutter of a frame, a casing having a table to receive the loose grain, a hopper to receive the bundles, an endless carrier, with its pulleys, shafts, and driving mechanism, for carrying the bundles to the knife, a hinged drop having a wedge-shaped guide-plate to bring the bundle and knife into proper relative positions, a slotted face-plate for the knife to project through, a guard-plate to cover and protect the knife, a knife-holder and knife, and a knife-driving mechanism, whereby the bands will be cut with certainty, as will be hereinafter fully described.

In the drawings, A represents the frame of the band-cutter, which may be placed at either side of the feed-table of a thrasher, and is designed to be connected with the frame of the thrasher by bolts or other suitable means.

To the upper part of the frame A is attached a casing, B, which is made with closed bottom, back, and sides. The bottom of the casing B is extended forward to form a table, C, to receive the grain after the bands have been cut, and from which the grain is transferred to the feed-table of the thrasher and fed to the cylinder by the feeder. The rear parts of the sides of the casing B are extended upward at an inclination, and their ends are rounded off, and the back of the casing is curved forward, as shown in Figs. 2 and 3, to form a space for the upper part of the endless carrier.

To the top of the casing B is attached the hopper D, into which the bound bundles are laid, and which is strengthened in place by metal straps E, attached to its end parts and to the casing B. The ends of the hopper D are closed by plates F, attached to the hopper D and extended down along the upper edges of the side casings, B. In case the stalks of the grain are very long the end plates, F, can be detached to allow the grain to pass through the machine freely.

G is the carrier, which is formed by attaching cross-bars to an endless belt, which cross-bars may be provided with spikes to cause them to carry the grain forward more surely. The endless carrier G passes around pulleys H I attached to the shaft J K, pivoted to the lower and upper parts of the side casings, B, and around guide-pulleys L, pivoted to the side casings, B, at their angles, as shown in Fig. 2, so that the upper part of the carrier G will be inclined and its lower part horizontal or nearly horizontal.

To one end of the shaft J is attached a large pulley, M, around which passes a belt, N. The belt N also passes around a smaller pulley, O, attached to the end of a shaft, P, which is pivoted to the lower part of the frame A, and has a beveled-gear wheel, Q, attached to it. The teeth of the beveled-gear wheel Q mesh into the teeth of the beveled-gear wheel R attached to the shaft S, which revolves in bearings attached to the frame A, and has a pulley, T, attached to it to receive a belt, which belt also passes around a pulley attached to the driving mechanism of the thrasher, so that the band-cutter can be driven from the driving mechanism of the thrasher. To the other end of the shaft P is attached a pulley, U, around which passes a belt, V. The belt V also passes around a pulley, W, attached to the end of the shaft X. The shaft X revolves in bearings in the front straps, E, of the hopper D, and to it or the pulley W is rigidly attached a pulley, Y, around which passes a belt, Z. The belt Z also passes around a pulley, $a$, pivoted to the drop $b$, which is made wedge-shaped, as shown in Figs. 2 and 3, and is hinged at its thin edge to the shaft X.

To the inner side of the pulley $a$ is attached, or upon its side is formed, a beveled-gear wheel, $c$, the teeth of which mesh into the teeth of a beveled-gear wheel, $d$, pivoted in a recess of the forward corner of the drop $b$.

To the forward side of the beveled-gear wheel $d$ is attached a crank-wheel, $e$, to the crank-pin of which is pivoted the outer end of a pitman, $f$. The inner end of the pitman $f$ is pivoted to a bar or block, $g$, to the lower edge of which is attached a semicircular knife, $h$, which projects through a slot in the face-plate $i$, attached to the lower side of the drop $b$ and to the lower edge of the guard-plate $j$. The guard-plate $j$ is attached at one end to a block attached to the forward edge of the drop $b$, and its other end is left free to allow the crank-wheel $e$ and the pitman $f$ to work freely.

In the lower part of the guard-plate $j$ is formed a slot, $k$, to receive a pin, $l$, attached to the knife-holder $g$, and limit the downward projection of the knife $h$. The end parts of the slot $k$ may be curved upward to raise the knife as it approaches the end of its stroke. With this construction the knife $h$ will be vibrated rapidly as the bundle is being carried past it by the carrier G, so that the knife will make several cuts while the bundle is passing it, and thus insure the cutting of the band.

The knife $h$ may be made with a smooth edge or with a sickle-toothed edge, and its shape may be varied as desired.

To the under side of the drop $b$ is attached a wedge-shaped plate, $m$, with its thin edge inward, and which is made of such a width that its thicker edge may be at a little distance from the knife $h$. With this construction the drop $b$ is raised by the pressure of the bundle against the plate $m$, and the said plate $m$ also acts as a guide to prevent the bundle from pressing against the side of the knife $h$ as the said bundle is carried forward by the carrier G, and to bring the knife and bundle into proper relative positions.

When the machine is to be used for cutting wire bands the sliding knife-holder $g$ and knife $h$ are replaced by one or more knives, $n$, which are pivoted in the slot of the plate $i$, so as to cut the wire bands against the lower side of the said plate $i$. The shanks of the knives $n$ project upward, and are pivoted to a bar, $o$, placed parallel with the plate $i$, and the end of which is pivoted to the end of the pitman $f$; or two sets of knives, $n$, may be used, pivoted in the slot of the plate $i$ in pairs, so as to operate like shears to cut the wire bands. In this case the shanks of the two sets of knives $n$ incline in opposite directions, and the shanks of each set are pivoted to their own bar $o$. In this case, also, each bar $o$ is pivoted to the end of its own pitman. The other ends of the pitman $f$ are pivoted to the cranks $p$, projecting in opposite directions from the center of the crank-wheel $e$, so that the two sets of knives $n$ will be vibrated at the same time in opposite directions.

Having thus described our invention, we claim as new and desire to secure by Letters Patent—

1. A band-cutter constructed substantially as herein shown and described, consisting of the frame A, the casing B, the hopper D, the carrier G and its pulleys, shafts, and driving mechanism, the hinged drop $b$, having slotted face-plate $i$, slotted guard-plate $j$, and wedge-shaped guide-plate $m$, and the knife-holder $g$ and knife $h$ and their driving mechanism, as set forth.

2. In a band-cutter, the combination, with the frame A, casing B, table C, and hopper D, of the endless carrier G and its pulley H I L L, shaft J K, and a driving mechanism, the said pulleys and shafts being so arranged in the casing that the upper part of the carrier will be inclined and under the hopper, while the lower part will be horizontal, or nearly so, and under the knife, substantially as herein shown and described, whereby the bundles are carried to the knife and the loose grain deposited upon the table, as set forth.

3. In a band-cutter, the combination, with the frame A, casing B, hopper D, and carrier G, of the hinged drop $b$, having wedge-shaped guide-plate $m$, to bring the knife into proper position upon the bundles, the slotted face-plate $i$ for the knife to pass through, and the guard-plate $j$ to protect the knife, and the knife-holder $g$ and knife $h$, and the knife-driving mechanism, substantially as herein shown and described, whereby the bands of large and small bundles can be cut with certainty, as set forth.

4. In a band-cutter, the combination, with the hinged drop $b$, the slotted face-plate $i$, the guard-plate $j$, and the crank-wheel $e$ of the knife-driving mechanism, of the pivoted knives $n$, one or more, the bar $o$, pivoted to the knife-shanks, and the pitman $f$, substantially as herein shown and described, to adapt the machine for cutting wire bands, as set forth.

5. In a band-cutter, the combination, with the hinged drop $b$, the slotted face-plate $i$, the guard-plate $j$, the crank-wheel $e$ of the knife-driving mechanism, the pivoted knives $n$, the pivoted bar $o$, and the pitman $f$, of a second set of pivoted knives, $n$, a second bar, $o$, a second pitman, $f$, and a double crank, $p$, substantially as herein shown and described, whereby wire bands can be cut with a shear movement, as set forth.

GEORGE BIEHN.
RUDOLPH WEIDAUER.

Witnesses:
HENRY W. WRIGHT,
BENJAMIN R. BONES.